Jan. 12, 1960     R. L. MAGOVERN     2,921,101
DEHYDROGENATION PROCESS
Filed Sept. 11, 1956     4 Sheets-Sheet 1

FIG. 1

INVENTOR:
ROBERT L. MAGOVERN
BY: *James Todorovic*
HIS ATTORNEY

INVENTOR:
ROBERT L. MAGOVERN
BY: *James Todorovic*
HIS ATTORNEY

Jan. 12, 1960  R. L. MAGOVERN  2,921,101
DEHYDROGENATION PROCESS
Filed Sept. 11, 1956  4 Sheets-Sheet 4

FIG. 3B

INVENTOR:
ROBERT L. MAGOVERN
BY: James Todorovic
HIS ATTORNEY

United States Patent Office 2,921,101
Patented Jan. 12, 1960

2,921,101

DEHYDROGENATION PROCESS

Robert L. Magovern, El Cerrito, Calif., assignor to Shell Development Company, New York, N.Y., a corporation of Delaware Application September 11, 1956, Serial No. 609,196

14 Claims. (Cl. 260—680)

This invention relates to an improved process for the conversion of organic compounds. It relates more particularly to an improvement in the dehydrogenation of organic compounds to less saturated compounds including olefinic unsaturates and aromatics.

It has been found recently that many organic compounds can be dehydrogenated by exposing a mixture of the compound and a substantial proportion of elemental iodine in vapor phase to a temperature above 300° C. for a relatively short time. Such reactions are disclosed in copending applications Serial Nos. 489,301; 489,302; and 489,303, filed on February 18, 1955. These dehydrogenation reactions include, for example, the conversion of paraffins to olefins and diolefins, of olefins to diolefins, of paraffins to aromatics (dehydrocyclization) and other reactions in which organic compounds are converted to other compounds having a higher carbon-to-hydrogen ratio. These reactions have been found to proceed generally with astonishing efficiency at the preferred reaction conditions. For each atom of hydrogen removed from the feed compound one atom of iodine is required. The requirement of iodine per pass is, therefore, very high when the conversion per pass is high. It is possible to reduce materially the amount of elemental iodine that must be charged with the organic reactants by reconverting some of the hydrogen iodide to elemental iodine while it is present in the reaction mixture at reaction conditions. It has been proposed to improve iodine utilization in such a process by adding oxygen to the dehydrogenation reaction zone to convert hydrogen iodide to iodine and water. It is the principal object of this invention to provide a process adapted for carrying out these reactions on a commercial scale. It is, therefore, an object of this invention to provide an improved process for iodine-effected dehydrogenation, including dehydrocyclization. This object will be better understood, and others will become apparent, from the description of the invention, which will be made with reference to the accompanying drawing, wherein:

This invention provides an improved process for iodine-effected dehydrogenation of organic compounds in which a portion of the hydrogen iodide formed in the dehydrogenation zone is reacted therein with oxygen to regenerate iodine and another portion of said hydrogen iodide, recovered from dehydrogenation zone effluent by absorption in an aqueous solvent of high hydrogen iodide concentration is recovered from a portion of said solvent as a hydrogen iodide vapor stream of low water content having a substantially higher hydrogen iodide to water ratio than the rich solvent, and is returned to a zone immediately preceding the dehydrogenation zone where it is converted to iodine by reaction with oxygen.

Figure 1:
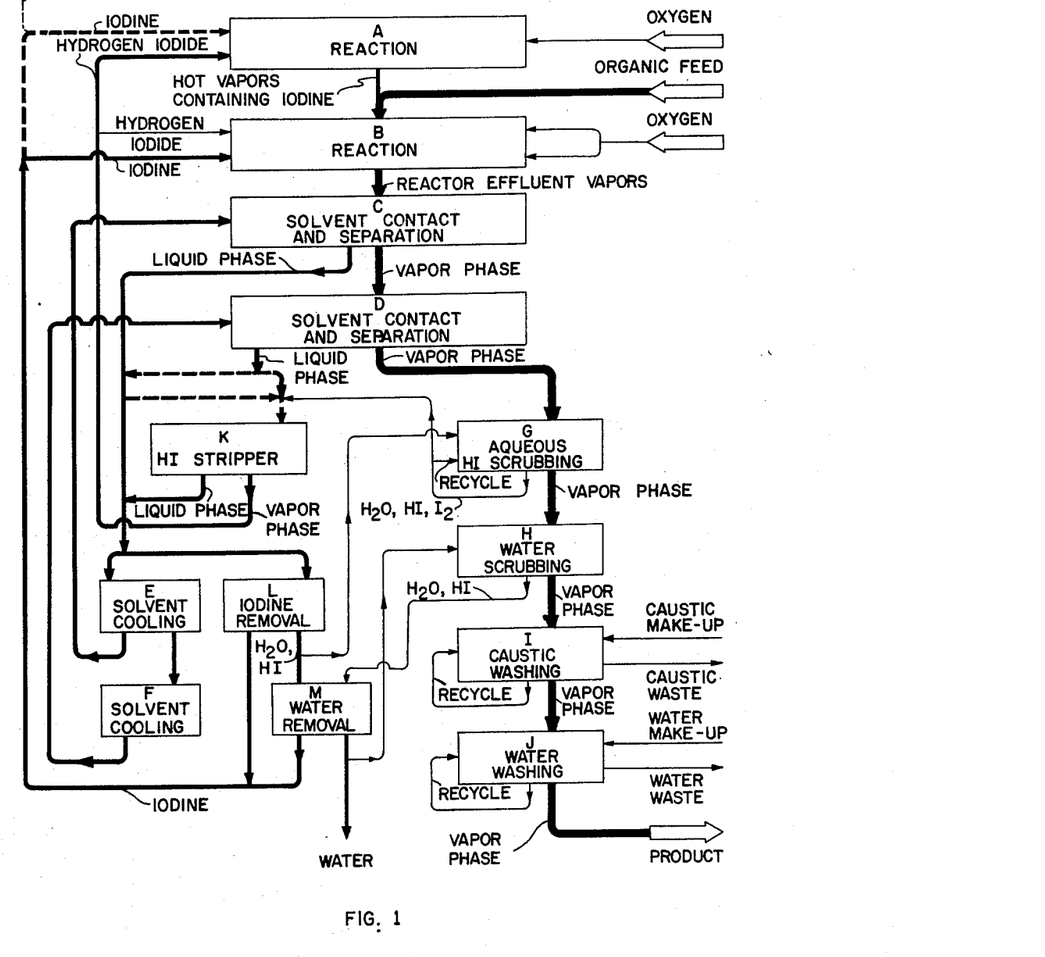
Figure 1 is a schematic representation of the process steps of the present invention.

The process is best described by reference to the drawing. As shown in Figure 1 the process equipment in one mode of operation provides a first reaction zone A and second reaction zone B, a first solvent contact and separation zone C, a second solvent contact and separation zone D, first and second solvent cooling zones E and F, vapor scrubbing and washing zones G, H, I and J, hydrogen iodide stripping zone K, iodine removal zone L and water removal zone M. Reaction zones A and B are so arranged that the total effluent from zone A passes directly to zone B. Reaction zone B and solvent contact zone C are so arranged that there is no time for substantial reaction of organic compounds with iodine species present in the reactor effluent. Solvent contact zones C and D are similarly arranged to prevent substantial reaction of organic compounds with iodine species.

In a continuous operation, elemental oxygen and a hydrogen iodide vapor stream of low water content are reacted in reaction zone A to form elemental iodine and water. The hydrogen iodide stream is obtained from a source described hereafter. If desired, elemental iodine may be added in reaction zone A, although it does not participate in the reaction therein. The iodine-reactive organic feed to be converted by dehydrogenation, preferably vaporized and heated to reaction temperature, is injected into the hot vapor stream passing from zone A to dehydrogenation zone B. Although not shown in Figure 1, additional organic feed may be added in the dehydrogenation zone, either in vapor or liquid phase. As the resulting vapor mixture moves from the inlet through zone B, the elemental iodine reacts with the organic feed to produce organic intermediate- and product-compounds having higher carbon-to-hydrogen ratios than the feed, and hydrogen iodide. Downstream in reaction zone B, elemental oxygen is injected into the reaction mixture. Oxygen may be injected at a single point, at a number of spaced points, or throughout the length of the reaction zone, but in limited amounts defined hereinafter. The oxygen serves in the dehydrogenation zone to convert hydrogen iodide, present as a result of the reaction, to elemental iodine for further utilization in the reaction. The reaction of oxygen with the organic material is minimized by the presence of the substantial portion of iodine. The exothermic heat of the reaction of oxygen wtih hydrogen iodide serves to maintain the reaction temperature in zone B at the desired level, which is between 450° C. and 800° C. in most cases.

The oxygen used in zones A and B may be of high purity, e.g. 95% or higher concentration, or it may be a diluted stream, e.g. air or air enriched with oxygen.

The organic components of the effluent from zone B pass in series through solvent contact and separation zones C and D, where the vapor phase is intimately contacted with a liquid solution whose components are water, hydrogen iodide and, generally, iodine. The iodine, if present, is believed to be associated with hydrogen iodide in such a solution in the form of $HI_3$ or other association complexes.

In the mode illustrated in Figure 1, at least the bulk of the elemental iodine present in the reactor effluent is absorbed by the solvent in zone C; all but very small amounts of remaining iodine and hydrogen iodide are removed from the vapor phase in zone D.

It is not essential in the present process that elemental iodine, per se or complexed, be present in the solvent streams entering zones C and D. In a continuous operation, however, the concentration of iodine in the solvent stream will build up. The concentration of iodine in the aqueous solvent must be kept sufficiently low so that it does not interfere with the operation of the process. At high concentrations and temperatures the iodine vapor pressure in equilibrium with the solvent may prevent complete iodine absorption. A substantial concentration of hydrogen iodide serves to keep iodine in solution in the aqueous solvent. In a practical operation, for example, the weight ratio of iodine to hydrogen iodide in the solvent entering zone C and zone D is about 0.9:1. The solvent contains about 55% by weight hydrogen iodide on an iodine free basis. By absorption of iodine in zone C and of hydrogen iodide in zone D, the ratio of iodine to hydrogen iodide in the liquid phase after contact is about 1:1 for the first contact and about 0.6:1 for the second contact. The operation may be modified by using a higher iodine to hydrogen iodide ratio in the first contact zone, provided the conditions in the second zone are such that iodine remaining in the vapor phase is absorbed.

An important step in the process of this invention is the recovery of a stream substantially enriched in hydrogen iodide from at least a portion of the rich solvent removed from contact with reactor effluent. To permit this, the solvent entering the contact zone in which the bulk of the hydrogen iodide is absorbed contains such a high concentration of hydrogen iodide relative to water that a portion of the resulting aqueous phase can subsequently be treated in a simple manner to strip a hydrogen iodide vapor stream of low water content therefrom. It is, therefore, important, in a continuous operation of this process, that in the portion of solvent into which the bulk of hydrogen iodide from the reactor effluent has been absorbed the hydrogen iodide concentration, relative to water is substantially in excess of that which occurs in a constant-boiling mixture (C.B.M.) of hydrogen iodide and water.

The concentration of hydrogen iodide and water in a constant-boiling mixture varies somewhat with the pressure of the system. Thus, the C.B.M. hydrogen iodide concentration in water is 57 percent by weight at zero p.s.i.g. and 55 percent by weight at 35 p.s.i.g.

The hydrogen iodide concentration in the rich solvent, i.e. that which has absorbed hydrogen iodide from the effluent, should exceed the concentration of hydrogen iodide in a constant-boiling mixture (at pressures prevailing in the hydrogen iodide separation step) by at least about 2 percent and preferably by at least about 4 percent by weight. The hydrogen iodide concentration in the lean solvent used to absorb hydrogen iodide is, therefore, approximately that of a constant-boiling mixture. It is usually at least within 2 percent by weight of the C.B.M. concentration. It may exceed the C.B.M. concentration but is not, usually, substantially in excess thereof.

Some cooling of the reactor effluent is desirably provided in solvent contact zones C and D. To do this the temperature of the solvent passing to zone C is adjusted in cooling zone E and that passing to zone D is further lowered in cooling zone F. It is necessary to adjust the temperature and pressure in solvent contact and separation zone D in such a manner that very little hydrogen iodide remains in the vapor phase. As the solvent entering zone D contains hydrogen iodide and water at or near their C.B.M. ratio, very little water remains in the vapor stream leaving zone D. The vapor stream separated in zone D is substantially free of iodine species. By this is meant that it contains only relatively small amounts of hydrogen iodide and iodine, e.g. less than 10 percent by weight—which is less than 3 mole percent— and usually much lower concentrations. This amount of iodine species represents a very small percentage of the total iodine species which were present in the reactor effluent.

When diolefins are among the desired reaction products it is important that the time of contact between organic product and iodine species in the reactor effluent be as nearly zero as practical, e.g. in the range from 0.01 to 0.1 second, and not exceeding one second. The production of diolefins is further described in patent application Serial No. 563,658 of J. H. Raley et al., filed February 6, 1956. Even in the absence of diolefins it is preferred to maintain the time interval between withdrawal of reactor effluent and removal of iodine species by solvent contact relatively short, preferably less than one second, when the product contains very reactive monoolefins or other very reactive compounds. If the only unsaturation in the reaction product is of aromatic nature the time interval may be longer without causing objectionable loss of desired product.

The total aqueous liquid removed from zones C and D, is ultimately divided into several substantial portions. As illustrated by dashed lines in Figure 1, the aqueous liquid phase from zone D may be combined with that from zone C before any division is made or the liquid from zone D may be taken directly as one of the portions, specifically the one that is passed to zone K. At least part of the aqueous liquid from zone C has its content of iodine species adjusted by addition of a portion of liquid from other parts of the system e.g. from stripping zone K, as illustrated. Adjusted aqueous solvent then passes to cooling zone E and thence to solvent contact zone C; part is further cooled in zone F and returned to contact in solvent contact zone D. A third portion is treated to remove therefrom for discard an amount of water at least equal to that formed by reaction of hydrogen iodide and oxygen in the reaction zones. As shown, this third portion is treated in iodine removal zone L to remove the elemental iodine therefrom. The iodine is returned to reaction zones A and/or B. The aqueous hydrogen iodide from zone L may be used in part to scrub the product vapors in zone G while the remainder thereof is treated in water removal zone M to produce further elemental iodine, for return to the reactors, and essentially iodine-free water, part of which is discarded while part may be used to scrub product vapor in scrubbing zone H.

The aqueous liquid phase recovered from zone D contains hydrogen iodide in excess of the concentration of a constant-boiling mixture with water. Preferably, this stream is sent directly to hydrogen iodide stripping zone K where a hydrogen iodide stream of low water content, having a substantially higher hydrogen iodide concentration than said liquid phase, is recovered for return to reaction zone A and the remaining mixture, which contains at least the C.B.M. concentration of hydrogen iodide in water, is returned to the liquid phase recovered from zone C. In an alternative operation, the aqueous phase from zone D is combined with that from zone C, and a portion of the combined mixture is passed to zone K.

The vapor stream from separation zone D passes in sequence through the following zones: scrubbing zone G, in which it is contacted with an aqueous hydrogen iodide stream for removal of remaining elemental iodine; scrubbing zone H, in which it is contacted with water to remove entrained aqueous hydrogen iodide; and caustic wash zone I and water wash zone J, which work in the conventional manner and serve to remove remaining small amounts of elemental iodine and hydrogen iodide as well as other impurities. The product leaving zone J is then further treated in accordance with its nature, e.g. by fractional distillation, solvent extraction, crystallization, absorption, or adsorption, separately or in combination, to recover desired product.

As illustrated, the aqueous hydrogen iodide used in zone G is a portion of the liquid from which iodine has been removed in zone L. After use in zone G, this liquid passes to the feed to zone K; the water and iodine content of this portion thus returns ultimately to the liquid stream passing to zone E, serving to adjust the elemental iodine content thereof.

Losses of iodine from the system may be compensated for by adding makeup either as elemental iodine or hydrogen iodide at any of several suitable places in the system. For example, makeup elemental iodine or hydrogen iodide may be added in reaction zone A. Iodine makeup may be added in the form of hydrogen iodide in reaction zone B preceding at least one oxygen injection point or it may be added to the circulating solvent stream. Makeup is only a small part of the total iodine in the system. Ordinarily it is added in the form of elemental iodine.

Figure 2:
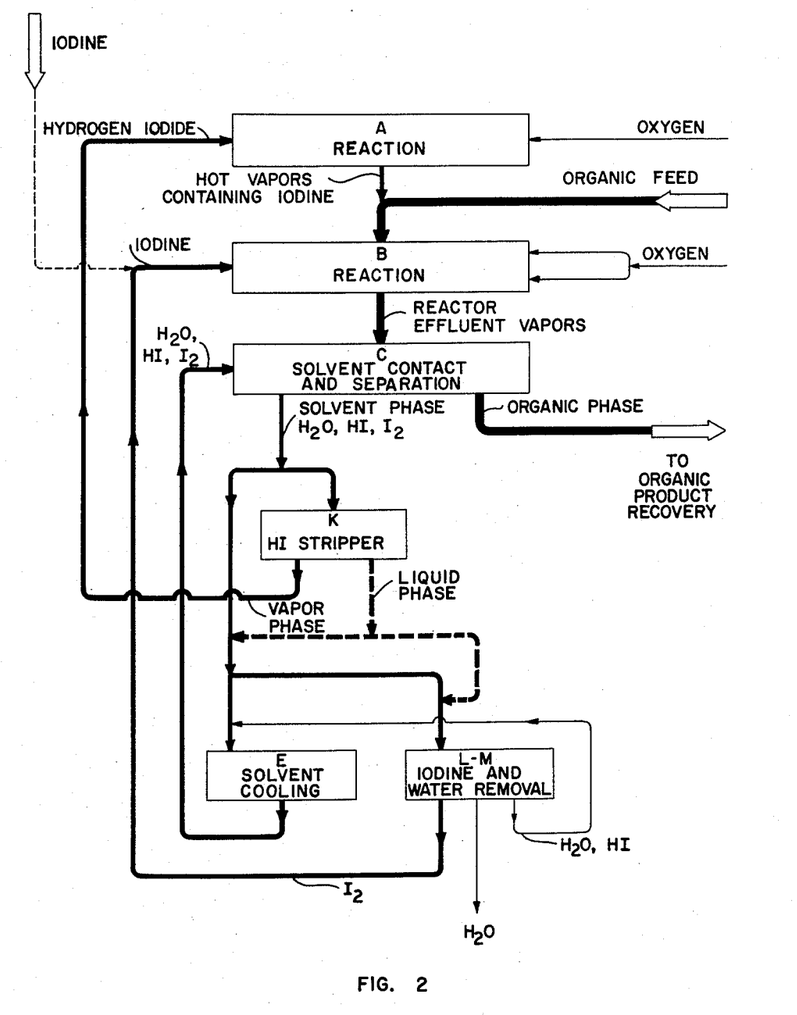
Figure 2 is a simplified schematic representation of the process steps of the present invention.

The invention in its simplest aspects is illustrated in Figure 2 of the drawing. The processing zones identified by letters are the same as zones identified by the identical letters in Figure 1.

The operation of reaction zones A and B is the same as described in connection with Figure 1. The reactor effluent vapor is contacted with an aqueous solvent in solvent contact and separation zone C. The temperature of the solvent stream and the concentration of hydrogen iodide in the aqueous solvent are such that substantially all elemental iodine and hydrogen iodide are removed from the reactor effluent in this stage. The organic phase removed from solvent contact zone C may be further treated by successive scrubs with aqueous hydrogen iodide, water, caustic and water as has been described. In any case, desired organic product is ultimately recovered from the organic phase.

The liquid aqueous solvent phase withdrawn from zone C contains hydrogen iodide, water and elemental iodine; the ratio of hydrogen iodide to water in this liquid exceeds the ratio of these components which form a constant-boiling mixture. A portion of this rich solvent is passed to hydrogen iodide stripping zone K. If desired, all of the rich solvent may be passed through the stripping zone. However, the illustrated operation is usually preferred. A vapor stream containing hydrogen iodide and relatively little water, is removed in zone K, as well as a liquid phase containing hydrogen iodide and water in at least the contant-boiling mixture ratio, and iodine. The hydrogen iodide vapor stream is returned at least in substantial part to reaction zone A. A part may be passed to zone B. The liquid phase may be combined with that portion of the aqueous liquid phase from zone C which has not gone to stripping zone K or it may be combined with the part thereof which passes to the iodine and water removal zone LM, which represents the combined zones L and M of Figure 1. The portion of the aqueous liquid phase from zone C which passes to zone LM is treated therein to remove elemental iodine, to convert at least a substantial part of the hydrogen iodide to elemental iodine and to remove water substantially free of all iodine species. Elemental iodine is returned from this zone to at least one of said reaction zones. An amount of water is discarded which is at least approximately equal to the water formed by oxidation of hydrogen iodide. Remaining water as well as unconverted hydrogen iodide, if any, is returned to the aqueous solvent stream e.g. to the portion passing to cooler E, to adjust the concentration of iodine species therein.

A substantial portion of the solvent phase removed from zone C, diluted to a lower hydrogen iodide to water ratio by addition of the stream of lower hydrogen iodide content from zones K and LM, passes through solvent cooling zone E and is then returned to further contact with reactor effluent in zone C.

The use of aqueous solvent containing hydrogen iodide to contact reactor effluent in accordance with this invention results in a rich solution or solutions containing essentially all of the elemental iodine and hydrogen iodide as well as most of the water formed in the reaction. By maintaining the relatively high concentration of hydrogen iodide to water in the solvent used to contact the effluent, as previously specified, it becomes possible to recover a substantial proportion of the hydrogen iodide present in the reactor effluent by a simple stripping of hydrogen iodide from a portion of the hydrogen iodide-rich aqueous solvent after contact. The hydrogen iodide stripped out is recovered as a vapor stream having a hydrogen iodide concentration substantially in excess of that in the rich solvent from which it is stripped. The stripper overhead consists essentially of hydrogen iodide and water. Its hydrogen iodide concentration is at least 65 percent by weight. Preferably its water content is less than 10 percent by weight and desirably as low as 5 percent.

Not all of the hydrogen iodide removed from the reactor effluent can be returned to the reaction zones as vapor stripped from the rich solvent because of the necessity of rejecting water from the system. Since hydrogen iodide and water form a constant-boiling mixture, the hydrogen iodide concentration in the solution cannot be reduced by distillation below the constant-boiling mixture concentration. It is, therefore, necessary to process a side stream of the aqueous solvent removed from contact with the reactor effluent to remove water therefrom. In order to break the azeotrope composition of this side stream at least a substantial part of the hydrogen iodide in it is oxidized to water and iodine, which are easily separable after oxidation is substantially complete. In the system illustrated in Table I, below, the rejecting of water requires about 25 percent of the hydrogen iodide in the reactor effluent to be thus oxidized externally. The percentage of the hydrogen iodide to be oxidized externally may vary within wide limits depending on the conditions in the reaction zones, e.g. the degree of reconversion of hydrogen iodide to iodine in zone B.

Figure 3A:
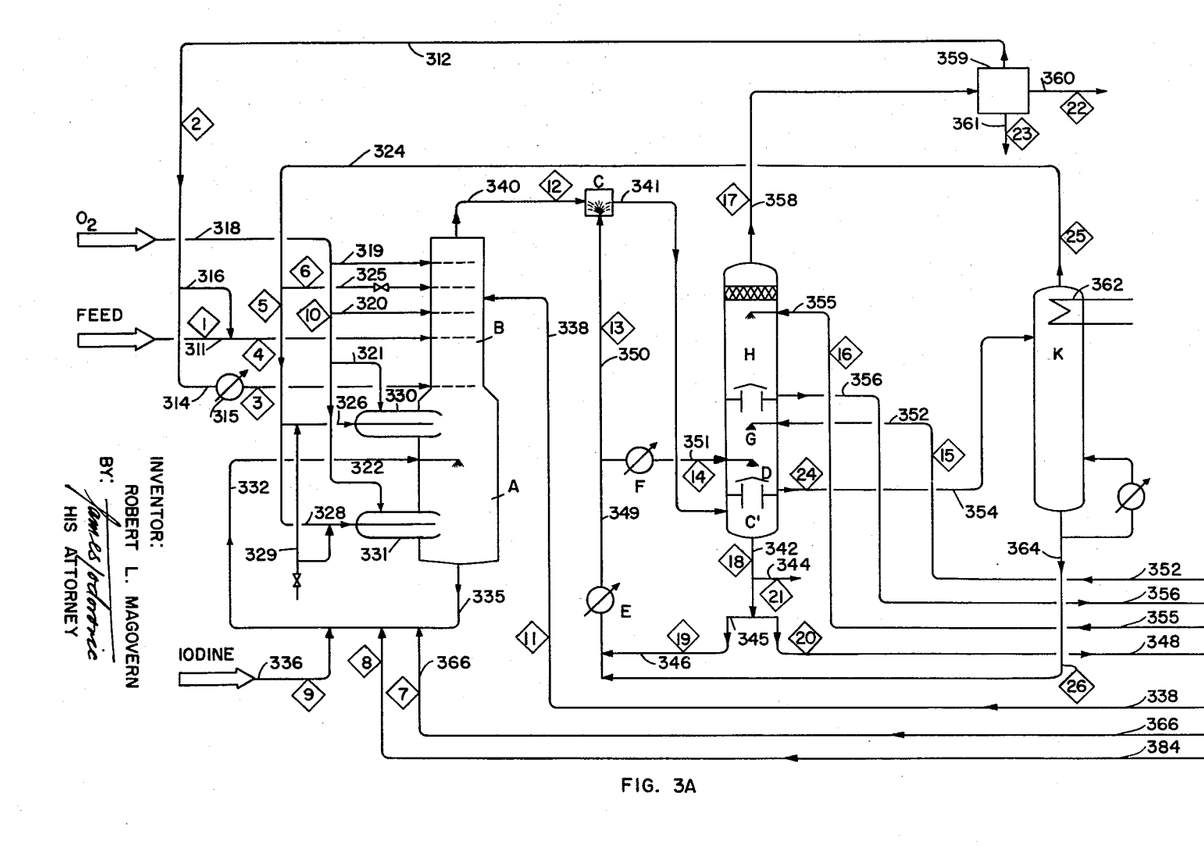
Figure 3 is a schematic process flow diagram of an effective plant for the practice of the invention.
Figure 3B:
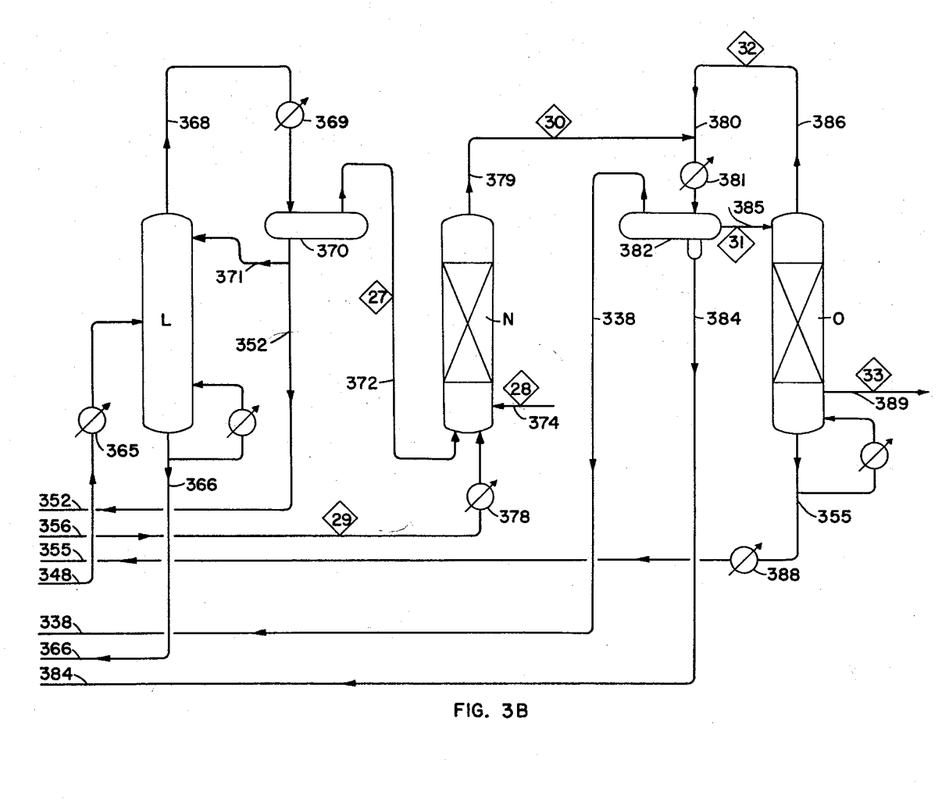

In the treatment of the side stream of solvent recovered from contact with reactor effluent it is convenient but not essential to first remove all elemental iodine therefrom, as illustrated by zone L in Figure 1 and Figure 3. This iodine is returned to the reaction zones. At least a substantial part of the side stream is then treated to convert hydrogen iodide therein to iodine and water, the iodine being returned to the reaction zones and sufficient water being withdrawn from the system to maintain the water content of the circulating solvent approximately constant.

Figure 3 of the drawing illustrates the present invention in greater detail, with schematic representation of suitable apparatus. It is not drawn to scale. To simplify the description, various pieces of accessory equipment, e.g., valves, pumps and instruments, which may be desirable or even necessary for operation of the process but which readily can be provided as required and desired by those skilled in the art, have been omitted. Valves are shown only where necessary to illustrate certain optional or alternative modes of operation.

The processing zones are identified by letters. The same letters are used as in Figures 1 and 2 for corresponding zones.

Merely as illustrative, the process will be described as applied to a fresh feed consisting of n-butane. Butane and butylenes recovered from the product stream are recycled for additional conversion so that the ultimate reaction product is essentially only butadiene-1,3. The conditions recited, e.g. temperatures, are merely illustrative of a typical operation. Table I shows specific conditions, flow rates and stream compositions for the process.

In the preferred mode of the present invention the reactor operates essentially adiabatically. In such operation the several streams entering and leaving the reactor vessel are so controlled in quantity, temperature, and concentration that the heat added plus the heat liberated in the exothermic oxidation of hydrogen iodide equals the heat consumbed in the endothermic dehydrogenation of the charge stock plus the heat consumed in bringing streams to reaction temperature, that withdrawn in the effluent stream, and that lost through the walls. Table I illustrates such a balanced operation.

The reactor is suitably constructed as a cylindrical vessel lined with material resistant to the corrosive reactants at reaction temperatures. Ceramics, such as silicon carbide and fused kaolin, are suitable. Certain metals, e.g. platinum and palladium are also suitable.

Contact zone C is suitably a section of highly corrosion resistant pipe into which there is injected a finely dispersed liquid spray of solvent comprising essentially water, hydrogen iodide and iodine.

The separating section C' of the first contact and separation zone as well as the second solvent contact and separation zone D and scrubbing zones G and H are shown in a single vessel. Zone C' and the separating portion of zone D are suitably in the form of cyclone-type separators. The contacting portion of zone D and the scrubbing zones may be equipped with contact means such as perforated or bubble cap trays. The vapors are withdrawn from the top of the scrubbing tower which may contain a suitable demisting section to remove entrained liquid droplets from the vapor overhead stream.

Figure 3 does not detail the further treatment of the product stream leaving the scrubber. The product workup zone, shown schematically, includes caustic and water wash zones I and J of Figure 1 as well as other suitable equipment, known to the art, for separating the $C_4$ hydrocarbon product into butane, butylenes and butadiene, and to separate small quantities of other materials.

Solvent cooling zones E and F are conventional heat exchangers. Hydrogen iodide stripping zone K and iodine removal zone L are suitably distillation columns of conventional design including the usual associated equipment. They may be packed columns or bubble tray columns. The equipment corresponding to water removal zone M of Figure 1 includes oxidizer N and water stripper O whose operation will be described hereafter.

Since the streams which contain iodine species are generally corrosive, the process equipment must be constructed of suitable corrosion resistant materials. Platinum, palladium and tungsten are resistant to corrosion under the conditions of the present process, but certain less expensive materials can also be used. Ceramics, such as fused alumina or graphite, or ceramic linings, such as glass on steel or acid proof brick over a plastic membrane on steel, are suitable under conditions prevailing in contact and separation zones C and D and scrubbing zones G and H. Titanium is also suitable at temperatures up to 110° C. in oxidizing solutions. Certain alloys containing less than 10 percent iron, e.g. Hastelloy C, an alloy of nickel, molybdenum, chromium, tungsten and iron, can be used at the lower temperatures and also at higher temperatures as the concentration of hydrogen iodide and iodine decreases. The scrubber may also be constructed of or lined with unfilled phenolic thermosetting resin, such as that sold commercially as "Chemplas" or of certain thermosetting phenolic or furan resins filled with graphite or asbestos, sold commercially under the trade name "Haveg." Columns K and L can be constructed as steel vessels protected with a polyvinylchloride lining and further containing acid proof brick lining or they may be made of glass-lined steel. Oxidizer N is suitably a glass-lined steel vessel. The pumps, pipes and heat exchangers are suitably constructed of Hastelloy C or similar alloy. Solvent coolers E and F are suitably constructed with a steel shell and tubes of impervious graphite, e.g. resin impregnated graphite sold commercially under the name "Karbate" and "Impervite" or without resin impregnant, such as "Graph-I-Tite."

In the operation of the embodiment of the process illustrated by Figure 3, fresh n-butane feed enters the system through line 311. Recycle butane and butylene is returned to the reaction from the product workup zone 359 through line 312. In the particular operation which is illustrated, only recycle butane and butylene is charged to the inlet of reaction zone B via line 314 containing vaporizer 315. An additional portion of the recycle butane and butylene is taken from line 312 through line 316 to be mixed with fresh feed in line 311. The resulting mixture of fresh feed and recycle is then injected as a liquid into the reaction mixture at a point downstream from the reactor inlet. The temperature of the recycle stream entering reaction zone B from line 314 is 580° C.; that of the stream entering the reactor through line 311 is 30° C. The vaporized feed stream from line 314 enters the reactor at a point at which there is a flow of gases containing a substantial amount of elemental iodine. This flow of gases is produced by injecting into and causing to react in reaction zone A elemental oxygen, either as oxygen gas or in diluted form, e.g. as air, and a vapor stream of hydrogen iodide containing, for example, only about 5 percent water. The oxygen enters the system through line 318. Oxygen required in the first reaction zone is drawn through lines 321 and 322. The vapor stream of hydrogen iodide enters through lines 326 and 328; it is obtained through line 324 from a source described below. The reaction of oxygen and hydrogen iodide may be carried out in an open reaction space; the two streams may be added, for example, through equipment of the nature of conventional burners, 330 and 331. In the particular mode of operation illustrated in the drawing, elemental iodine is passed to zone A as a liquid stream through line 332, for vaporization. This stream includes iodine entering via lines 366 and 384 from sources described below, as well as any unvaporized iodine taken from the bottom of zone A via line 335. Makeup iodine may also be included here, being added via line 336. One of the hydrogen iodide-oxygen "burners" is arranged below the point of liquid iodine injection, creating an upflow of hot gases which vaporize the iodine. The vapor mixture is further heated by a second "burner" arranged above the point of iodine injection.

The vapors entering dehydrogenation reaction zone B comprise elemental iodine, both that added as such and that resulting from reaction of hydrogen iodide and oxygen. The vapors further comprise water, mainly that resulting from the combustion of hydrogen iodide. The vapors further comprise any unconverted hydrogen iodide or excess oxygen. If the oxygen was diluted with inert diluent gas, the diluent is also included. The flow rates of the oxygen and hydrogen iodide in zone A are so adjusted that the amount of oxygen which leaves zone A in elemental form does not exceed the ratio of one molecular proportion of oxygen per atomic proportion of iodine present in all active iodine species in the mixture. Preferably there is little or no oxygen in the gases entering reaction zone B.

The vapor mixture enters zone B at a temperature approximating the desired reaction temperature of zone B. As previously mentioned, vaporized hydrocarbon feed from line 314 is admixed with the vapors from zone A at the inlet to zone B, and further feed is added through line 311. As the reaction mixture passes through zone B, hydrogen iodide is formed by reaction of butane and butylenes with elemental iodine. Further oxygen is, therefore added through lines 319 and 320. If desired, hydrogen iodide from line 324, may also be added to zone B, through line 325. A recycle gas stream from a source described below is added through line 338 to prevent loss of iodine from the system.

The total reactor effluent vapors pass through line 340 to solvent contact zone C. The residence time in line 340 is preferably as short as practical e.g., in the range from 0.01 to 0.1 second. It is preferable to insulate line 340 so that the vaporized mixture is not cooled below 300° C. In zone C the vaporized reactor effluent is contacted with a fine liquid spray of solvent which absorbs the predominant amount of the elemental iodine. The mixture passing from solvent contact zone C to separator C' through line 341 consists of a vapor phase containing butane, butylene and butadiene as well as hydrogen iodide, some water and small amounts of light gaseous products, and a liquid phase, present in the form of fine droplets, containing essentially water, hydrogen iodide and elemental iodine.

In separator C' the vapor phase is recovered as a vapor stream which passes upward into zone D while the separated liquid is withdrawn through line 342 into header 345. Small amounts of waste materials, e.g. tars, polymers and coke, may be removed from the liquid stream in line 342 by suitable separating devices, e.g. filters (not shown). The waste is withdrawn through line 344. The rich solvent in header 345 is divided into three substantial portions. Two of the substantial portions are passed as a single stream through line 346 to line 349, which contains cooler E. The stream is then split, one portion passing through line 350 to contact zone C and the other through line 351, containing cooler F, to contact zone D. The function of cooler F is to lower the temperature of the solvent stream passing to zone D sufficiently so that it can absorb the hydrogen iodide from the vapor stream passing up from zone C'.

The vapor passing into zone D is contacted with a spray of the solvent from cooler F. The resulting vapor stream passes upward from zone D to zone G where it is immediately contacted with a portion of aqueous hydrogen iodide obtained through line 352 from a source described hereafter. The combined "rich" scrubbing liquids from zones G and D are withdrawn through the separating portion of zone D to hydrogen iodide stripper K via line 354. Product vapors, now essentially free of iodine species, pass up through zone H where they are scrubbed with a stream consisting essentially of water, from line 355, to remove any remaining small amounts of hydrogen iodide. The used scrubbing solution withdrawn from zone H is passed to oxidizer N via line 356. The vapor product, containing at most only traces of iodine species, passes from the scrubber through line 358 to product workup zone 359, which contains the necessary equipment to separate a stream consisting essentially of butane and butylene for recycle through line 312, a product stream consisting essentially of butadiene, which is withdrawn through line 360, and a waste stream of other material which is withdrawn through line 361.

The feed to hydrogen iodide stripper K consists of the combined portion of the solvent stream which was used in zone D and the scrubbing liquid used in zone G. This is an aqueous solution of hydrogen iodide and elemental iodine in which the ratio of hydrogen iodide to water is greater than that in a constant-boiling mixture at the pressure prevailing in column K. Column K is a simple fractional distillation column which may be a packed column or one equipped with bubble trays. It has a bottoms reboiler as shown; the overhead vapor stream is partially condensed by condenser 362 which may be internal, as shown, or external. The overhead vapors, consisting of about 95 percent by weight hydrogen iodide and about 5 percent water are withdrawn through line 324 for return to the reaction zones as has been described. The bottoms fraction consists of an aqueous solution of hydrogen iodide and iodine in which the hydrogen iodide and water are approximately at a ratio corresponding to the constant boiling mixture at the pressure prevailing in column K, although the hydrogen iodide may be present in excess of the C.B.M. ratio. This stream is withdrawn through line 364; the part not recycled as bottoms through the reboiler passes to line 349 for use in contact zones C and D as has been described.

Turning now to the third substantial portion which was separated from the aqueous liquid phase withdrawn from C', namely the portion drawn out of header 345 via line 348, this is vaporized in vaporizer 365 and passes as a vapor charge stream to column L. Column L can be a conventional fractional distillation column including a reboiler as shown and an external condensation and reflux system. The bottoms stream withdrawn from column L is a stream of substantially pure liquid elemental iodine. The part not reboiled passes via line 366 to line 335 through which it is returned to the reactor as has been described. The overhead withdrawn from column L through line 368 is a vapor mixture of water and hydrogen iodide containing relatively little elemental iodine. This vapor mixture is partially condensed in condenser 369. The condensate is collected in drum 370 from which part is returned to column L as reflux via line 371 and part is passed via line 352 to zone G to be used as the scrubbing liquid therein. The uncondensed portion of the overhead vapor from line 368 is removed from drum 370 and passed to oxidizer N via line 372; the hydrogen iodide and water are essentially at their C.B.M. ratio in this mixture. In an alternative operation, not illustrated, a portion of the vapor in line 368 is taken to line 372 ahead of condenser 369, which then completely condenses the remaining overhead mixture.

A relatively small stream consisting essentially of water with only a small amount of hydrogen iodide, e.g. about 5 percent, passes to oxidizer N via line 356 containing vaporizer 378. This stream, which is withdrawn from scrubbing zone H, serves mainly to maintain the desired temperature in oxidizer N. The total amount added through line 356 is substantially less than the amount added through line 372. Oxygen enters oxidizer N near the bottom through line 374. The oxidation of hydrogen iodide takes place in the oxidizer in the vapor phase. The column is desirably packed with a solid material which promotes the oxidation of hydrogen iodide. Suitable solids are acidic porous solids such as silica-alumina cracking catalysts. The hydrogen iodide oxidation in oxidizer N is controlled in such a manner that substantially all the hydrogen iodide entering the oxidizer is converted to elemental iodine and water. The resulting mixture, withdrawn through overhead line 379, thus consists of elemental iodine and water, together with small amounts of inert gases which may enter with the oxygen, and at most only very small amounts of hydrogen iodide. This mixture passes to line 380 which contains condenser 381. The condensate is collected in drum 382. From drum 382 there is withdrawn a relatively small stream of liquid elemental iodine which passes to line 335 via line 384. A relatively small amount of gas, containing some elemental iodine, is vented from drum 382 and returned to reaction zone B via line 338 in order to conserve the iodine. The predominant amount of liquid is withdrawn from drum 382 via line 385. This liquid consists essentially of water containing only a very small amount of elemental iodine and hydrogen iodide, if any. In water purification zone O, which is suitably a stripping column, e.g. a packed column containing a reboiler, the remaining traces of iodine and hydrogen iodide are removed from the water charged through line 385. A vapor stream consisting of some water and essentially all the elemental iodine which was present in the feed to column O is taken overhead from column O through line 386 for return to line 380. Part of the bottoms stream withdrawn from column O, consisting essentially only of water, passes through line 355 containing cooler 388 to be used in scrubbing zone H and part is withdrawn from the system through line 389. The amount of water withdrawn through line 389 over a period of time is the same as the amount of water formed by reaction of hydrogen iodide and oxygen in reaction zones A and B and in oxidizer N.

The operations illustrated in Figure 3 can be modified in a number of ways without departing from the scope of this invention. For example, in operating the reactor as illustrated it may be desirable to replace some of the hydrogen iodide being oxidized in reaction zone A with a fuel such as natural gas. This may be particularly useful during start-up of a continuous operation. In that case, natural gas is added through line 329 and burned with oxygen in reaction zone A, using burners 331 and/or 330.

It should also be understood that the reactor as illustrated is only one of several types that may be usefully employed in the reaction. Section A of the illustrated reactor is the joint invention of this applicant and another and is not claimed herein. The vaporization of elemental iodine may be carried out in a separate vaporizing heat exchanger or furnace. The vaporized iodine may then be added into reaction zone A in which oxidation of anhydrous hydrogen iodide takes place, or it may be added at the inlet to dehydrogenation zone B. The oxidation of hydrogen iodide in a zone immediately preceding the reaction zone is, however, an essential part of the present invention.

The several solvent contact and scrubbing zones such as C', D, G and H may be arranged in separate vessels rather than in a single vessel as shown.

The iodine removal zone L may be omitted in some methods of operation; in that case the substantial proportion of the first aqueous solvent layer withdrawn through line 348 is passed directly to an oxidizer such as oxidizer N, for conversion of hydrogen iodide therein to elemental iodine. In such a modification it may be preferred to carry out only incomplete oxidation of hydrogen iodide in the oxidizer and to separate the effluent therefrom into an aqueous hydrogen iodide stream which is returned to the reactor effluent contacting system e.g. to scrubbing zone G or to line 349, an elemental iodine stream which is returned to the reactor via line 384 and a water stream substantially free of elemental iodine which is handled in water removal zone O.

Alternative methods may be employed for recovering the remaining iodine from the water stream in line 385. For example, zone O may be replaced by equipment consisting of chillers and filters to separate the iodine from the water as a solid. In that case solid iodine, recovered from the water, may be re-dissolved in a small amount of aqueous hydrogen iodide and returned to the reactor effluent contacting system, e.g. to line 349. In another method of operation, the iodine may be recovered from the water stream by means of adsorption on a suitable adsorbent, e.g. activated charcoal. The iodine may be removed from the adsorbent, for example, by means of a warm vapor stream. The iodine may also be removed from the water by liquid-liquid extraction with a suitable solvent, e.g. benzene, from which it is, in turn, recoverable by various methods, e.g. by liquid-liquid extraction with aqueous hydrogen iodide.

Instead of obtaining water for scrubbing zone H via line 355, it may be preferred to use fresh, cool water in zone H and discard an equivalent additional amount from water purification zone O through line 389.

The following table represents a typical application of the present invention to the preparation of butadiene from n-butane. Butylenes produced in each pass and unconverted butane are recycled to the reaction zone for further conversion to butadiene. The individual component streams are numbered, their numbers being shown on Figure 3 enclosed in diamonds. The numbers shown following the stream name in the tabulation refer to the flow lines of Figure 3.

TABLE I

I. Reaction zones

A. OPERATING CONDITIONS

Pressures: P.s.i.a.
    Inlet to first zone_________________________ 45
    Outlet from second zone___________________ 27

Temperatures: °C.
    Zone A, exit_______________________________ 580
    Zone B, average___________________________ 580
    HI to zones A and B (324)_________________ 122
    Oxygen to zones A and B (318)____________ 180
    $C_4$ Feed vapor (314 downstream from 315)___ 580
    $C_4$ Feed liquid (311 downstream from 316)____ 28
    Reactor effluent (340)_____________________ 580

B. COMPONENTS

| Number | Name and Constituents | Flow Rate, parts by weight per hour | Composition, percent by weight |
|---|---|---|---|
| 1 | Fresh $C_4$ feed (311, upstream from 316) n-Butane | 7,030 | 100.0 |
| 2 | Hydrocarbon recycle (312, upstream from 316): | | |
|  |   n-Butane | 557 | 11.3 |
|  |   Butylenes | 4,357 | 88.0 |
|  |   Butadiene | 32 | 0.7 |
|  |     Total | 4,946 | 100.0 |
| 3 | First feed injection (314, downstream from 316) | 2,207 | |
| 4 | Second feed injection (311, downstream from 316) | 9,769 | |
| 5 | Hydrogen iodide to Zone A (324, downstream from 325): | | |
|  |   Hydrogen iodide | 7,328 | 95.0 |
|  |   Iodine | 122 | 1.6 |
|  |   Water | 263 | 3.4 |
|  |     Total | 7,713 | 100.0 |
| 6 | Hydrogen iodide to Zone B (325) | 5,059 | same |
|  | Fresh iodine to Zone A (excludes recycle from line 335): | | |
|  |   Iodine (only traces of hydrogen iodide and water) | | 100.0 |
| 7 | (a) From column L (366) | 18,033 | |
| 8 | (b) From oxidizer accummulator (384) | 4,111 | |
| 9 | (c) Makeup (336) | 460 | |
|  |     Total | 22,604 | |
| 10 | Oxygen to zone A (321 and 322): | | |
|  |   Oxygen | 458 | 95.6 |
|  |   Nitrogen | 21 | 4.4 |
|  |     Total | 479 | 100.0 |
|  | Oxygen to zone B (319 and 320) | 3,252 | same |
| 11 | Vent from oxidizer settler (338) | 158 | v.i. |
| 12 | Effluent from Zone B (340): | | |
|  |   Hydrogen | 3 | 0.0 |
|  |   Nitrogen | 176 | 0.3 |
|  |   Carbon oxides | 244 | 0.5 |
|  |   Oxygen | 77 | 0.2 |
|  |   $C_3$ and lighter hydrocarbons | 656 (a) | 1.3 |
|  |   Butylenes | 4,429 | 8.6 |
|  |   Butadiene | 5,203 | 10.2 |
|  |   n-Butane | 554 | 1.1 |
|  |   Aromatics | 192 | 0.4 |
|  |   Hydrogen iodide | 16,358 | 31.9 |
|  |   Iodine | 18,239 | 35.6 |
|  |   Water | 4,272 | 8.3 |
|  |   $C_4$ Iodides | 561 | 1.1 |
|  |   Polymer | 108 | 0.2 |
|  |   Coke | 169 | 0.3 |
|  |     Total | 51,241 | 100.0 |

[a] Non-iodine species (excluding polymer)=11,534.

II. Reactor effluent separation

A. OPERATING CONDITIONS

Pressures: P.s.i.a.
    Solvent contact zone C____________________ 27
    Separation zone C'________________________ 20
    Scrubber overhead (358)__________________ 17

Temperatures: °C.
    Reactor effluent (340)_____________________ 580
    Solvent to zone C (350)___________________ 60
    Vapor-liquid mixture, from zone C (341)_____ 105
    Liquid from separator C' (342)____________ 105
    Solvent to zone D (351)___________________ 43
    Scrub liquid to zone G (352)______________ 43
    Liquid from zone D (354)_________________ 105
    Scrub liquid to zone H (355)______________ 43
    Liquid from zone H (356)_________________ 57
    Scrubber overhead vapor (358)____________ 47

B. COMPONENTS

| Number | Name and Constituents | Flow Rate, parts by weight per hour | Composition, percent by weight |
|---|---|---|---|
| 12 | Effluent from zone B (v.s.) | | |
| 13 | Solvent to zone C (350): | | |
| | Hydrogen iodide | 96,573 | 27.7 |
| | Iodine | 173,942 | 49.9 |
| | Water | 77,871 | 22.4 |
| | Total | 348,386 | 100.0 |
| 14 | Solvent to zone D (351) | 126,969 | same |
| 15 | Aqueous HI to zone G (352) | 8,985 | v.i. |
| 16 | Water to zone H (355) | 2,585 | v.i. |
| 17 | Scrubbed product (358): | | |
| | Non-iodine species, excluding polymer.ᵃ | 11,534 | 94.1 |
| | Hydrogen iodide | 1 | 0.01 |
| | Iodine | 0.5 | 0.00 |
| | Water | 459 | 3.7 |
| | $C_4$ Iodides | 270 | 2.2 |
| | Total | 12,265 | 100.0 |
| 18 | Liquid stream from separator C' (342): | | |
| | Hydrogen iodide | 96,573 | 26.3 |
| | Iodine | 191,638 | 52.3 |
| | Water | 77,871 | 21.2 |
| | $C_4$ Iodides | 291 | 0.1 |
| | Polymer | 108 | 0.0 |
| | Coke | 169 | 0.1 |
| | Total | 366,650 | 100.0 |
| 19 | To contact zones C and D (346) | 331,596 | (b) |
| 20 | To iodine separating column L (348) | 34,487 | (b) |
| 21 | To waste ($C_4$ iodides, polymer and coke) (344). | 568 | |
| 22 | Product (360): | | |
| | Butadiene | 5,171 | |
| | Butylenes | 72 | |
| 23 | Waste products and byproducts (361): | | |
| | Hydrogen | 3 | |
| | Nitrogen | 176 | |
| | Carbon oxides | 244 | |
| | Oxygen | 77 | |
| | $C_3$ and lighter hydrocarbons | 656 | |
| | Aromatics | 192 | |
| | $C_4$ Iodides | 561 | |
| | Total | 1,909 | |

ᵃ Composition supra; see component 12.
ᵇ Composition same as total liquid from C', except that $C_4$ iodides, polymer and coke have been removed.

III. HI stripping

A. OPERATING CONDITIONS

| | |
|---|---|
| Pressure (column K) p.s.i.a | ca. 45 |
| Temperature, bottom °C | 171 |
| Temperature, top °C | 121 |
| Temperature of charge (354) °C | 105 |

B. COMPONENTS

| Number | Name and Constituents | Flow Rate, parts by weight per hour | Composition, percent by weight |
|---|---|---|---|
| 24 | Charge stream (354): | | |
| | Hydrogen iodide | 56,431 | 36.1 |
| | Iodine | 63,960 | 40.8 |
| | Water | 36,143 | 23.1 |
| | Total | 156,534 | 100.0 |
| 25 | Overhead (324) | 12,772 | (ᵃ) |
| 26 | Bottoms (364): | | |
| | Hydrogen iodide | 44,296 | 30.8 |
| | Iodine | 63,757 | 44.3 |
| | Water | 35,708 | 24.9 |
| | Total | 143,761 | 100.0 |

ᵃ Composition same as component 5, supra.

IV. Iodine recovery and regeneration

A. OPERATING CONDITIONS

Pressures: P.s.i.a.
- Iodine separating column (L) ______ 70
- HI oxidizer (N) ______ 55
- Water cleanup (O) ______ 53

Temperatures: °C.
- Vaporized feed to iodine separating column (348) ______ 193
- Iodine separating column, top (368) ______ 184
- Iodine separating column, bottom (366) ______ 255
- Iodine separating column condensate (370) ______ 183
- Oxidizer feed (372) ______ 183
- Oxidizer feed (356) ______ 149
- Oxidizer effluent (379) ______ 465
- Oxidizer ______ Ca. 150 to 650
- Oxidizer effluent condensate accumulator (382) ______ 132
- Water cleanup column, top (386) ______ 138
- Water cleanup column, bottom (355) ______ 140

B. COMPONENTS

| Number | Name and Constituents | Flow Rate, parts by weight per hour | Composition, percent by weight |
|---|---|---|---|
| 20 | Feed to iodine separating column (348) | 34,487 | v.s. |
| 7 | Bottoms from iodine separating column (366): | | |
| | Iodine | 18,033 | 100.0 |
| | Overhead from iodine separating column: | | |
| 15 | (a) For use in zone G (352)— | | |
| | Hydrogen iodide | 4,965 | 55.2 |
| | Iodine | 26 | 0.3 |
| | Water | 3,994 | 44.5 |
| | Total | 8,985 | 100.0 |
| 27 | (b) Main oxidizer feed (372)— | | |
| | Hydrogen iodide | 4,134 | 55.4 |
| | Iodine | Trace | 0.0 |
| | Water | 3,334 | 44.6 |
| | Total | 7,468 | 100.0 |
| 28 | Oxygen to oxidizer (374): | | |
| | Nitrogen | 12 | 4.4 |
| | Oxygen | 264 | 95.6 |
| | Total | 276 | 100.0 |
| 29 | Minor oxidizer feed (356): | | |
| | Hydrogen iodide | 136 | 5.0 |
| | Iodine | 0 | 0.0 |
| | Water | 2,582 | 95.0 |
| | Total | 2,718 | 100.0 |
| 30 | Oxidizer effluent (379): | | |
| | Nitrogen | 12 | 0.1 |
| | Hydrogen iodide | 47 | 0.5 |
| | Iodine | 4,190 | 59.4 |
| | Water | 6,213 | 40.0 |
| | Total | 10,462 | 100.0 |
| 8 | Iodine from oxidizer effluent accumulator (384). | 4,111 | 100.0 |
| 11 | Vent gas from oxidizer effluent accumulator (338): | | |
| | Nitrogen | 12 | 7.5 |
| | Hydrogen iodide | Trace | 0.0 |
| | Iodine | 78 | 42.8 |
| | Water | 68 | 49.7 |
| | Total | 158 | 100.0 |
| 31 | Charge to water cleanup column (385): | | |
| | Hydrogen iodide | 47 | 0.7 |
| | Iodine | 84 | 1.3 |
| | Water | 6,564 | 98.0 |
| | Total | 6,695 | 100.0 |
| 32 | Water cleanup column overhead (386): | | |
| | Hydrogen iodide | Trace | 0.0 |
| | Iodine | 83 | 16.5 |
| | Water | 419 | 83.5 |
| | Total | 502 | 100.0 |
| | Water cleanup column bottoms: | | |
| 16 | (a) To scrubbing zone H (355)— | | |
| | Hydrogen iodide | 47 | 1.8 |
| | Iodine | Trace | 0.0 |
| | Water | 2,538 | 98.2 |
| | Total | 2,585 | 100.0 |
| 33 | (b) To waste (389)— | | |
| | Hydrogen iodide | Trace | 0.0 |
| | Iodine | 0.7 | 0.02 |
| | Water | 3,602 | 99.98 |
| | Total | 3,602.7 | 100.00 |

The process of this invention is applicable to the conversion of what are here designated as iodine-reactive organic compounds to different compounds having a higher carbon-to-hydrogen ratio, provided the product, as well as feed and intermediates, if present in the reactor effluent, are relatively insoluble in an aqueous solvent comprising hydrogen iodide and iodine, as described above.

In the preferred operation the vapor pressure of the organic phase is higher than the partial pressure of the solvent in the solvent contact and separation zones, and the separation is made between an organic vapor phase and an aqueous liquid phase. To avoid condensation of organic feed, intermediates or product in contact with the solvent, it is possible to make suitable adjustments of the pressure and temperature prevailing in the solvent contact and separation zones, and to adjust the partial pressure of the organic compounds by means of dilution with an inert gas. For example, if a relatively less volatile feed is to be reacted or product made, the oxygen may be supplied to the reaction zones in the form of air so that the nitrogen present will serve as diluent, reducing the partial pressure of feed and product in the reaction mixture.

With respect to hydrocarbons, the following are iodine-reactive and are, at proper reaction conditions, converted by contact with elemental iodine into the indicated more unsaturated reaction products, generally in reactions of very high selectivity.

Hydroaromatic alicyclic compounds can be dehydrogenated to the corresponding aromatic compounds. Compounds containing an aliphatic chain of at least 6 non-quaternary carbon atoms can be converted to aromatics by dehydrocyclization, as can cyclic compounds having an aliphatic chain or aliphatic chains capable of closing a ring of 6 carbon atoms. Compounds having an aliphatic chain of 2 to 5 non-quaternary carbon atoms and compounds having a ring of 5 carbon atoms can be dehydrogenated into compounds having a greater number of carbon-to-carbon double bonds. Certain more saturated compounds may also be converted to compounds having acetylenic triple bonds, e.g. ethane or ethene to acetylene. Compounds which have an aliphatic chain of at least 5 or 4 carbon atoms, including, respectively, 1 or 2 quaternary carbon atoms, and which have no chain of 6 non-quaternary carbon atoms, are converted by a reaction including conversion of a quaternary to a non-quaternary carbon atom into different compounds having the same carbon number as the feed, followed, if residence time is sufficient, by conversion of the latter compounds in accordance with their new structure, e.g. into aromatics.

The invention is, for example, particularly suitable for the following conversion reactions:

Ethane to ethylene and acetylene. Ethylene to acetylene. Propane to propylene and methylacetylene or allene.

Aliphatic compounds having from four to five contiguous non-quaternary carbon atoms in a chain to the corresponding olefins and diolefins, and particularly to conjugated diolefins. This includes the following conversions: n-Butane to 1-butene, 2-butene and 1,3-butadiene. 1-Butene or 2-butene to 1,3-butadiene. n-Pentane to 1-pentene, 2-pentene and 1,3-pentadiene. 1-Pentene or 2-pentene to 1,3-pentadiene. Isopentane to 3-methyl-1-butene, 3-methyl-2-butene, 2-methyl-1-butene and isoprene.

Aliphatic hydrocarbons having a chain of at least 6 contiguous non-quaternary carbon atoms and having from 6 to 16 carbon atoms per molecule to aromatic hydrocarbons. This includes the following conversions: n-Hexane to benzene. Straight chain heptenes to toluene and a small amount of benzene. Monomethylhexanes to toluene. n-Octane to aromatics predominating in ethylbenzene and ortho-xylene. Monomethylheptanes or monomethylheptenes to aromatics predominating in xylenes. $C_{10}$ saturates containing no quaternary carbon atoms, and the corresponding olefins, to substituted monocyclic aromatics with predominantly saturated side chains. The following is illustrative: 5-methylnonane to n-butylbenzene, propyltoluene, 1,4-dimethyl-2-ethylbenzene (2-ethyl-p-xylene), m-ethyltoluene, p-xylene and toluene plus some of the corresponding compounds with side chain unsaturation.

Non-hydroaromatic cycloparaffins and cycloolefins to corresponding cycloolefins and cyclodiolefins. For example: Cyclopentane to cyclopentene and cyclopentadiene-1,3. Methyl substituted cyclopentanes and cyclopentenes are similarly converted.

Hydroaromatic naphthenes and cycloolefins to corresponding aromatics. For example: Cyclohexane to benzene. Methylcyclohexane to toluene. 1,4-dimethylcyclohexane to p-xylene.

Aromatics with alkyl side chains of 2 or more carbon atoms, especially those with 2 to 3 carbon atoms in the chain, to aromatics having unsaturated side chains. For example: Ethylbenzene to styrene. n-Propylbenzene to β-methyl-styrene.

Although the reaction of hydrocarbons with iodine is highly selective, differences have been observed between various hydrocarbons, both in the rate of reaction and in the selectivity to a particular compound. Except for the effect of losing short fragments in the formation of aromatics, the reactions of iodine-reactive compounds with iodine are highly selective in producing a product having the same number of carbon atoms as the charge hydrocarbon. Thus, the present invention is not concerned with promotion of the cracking of hydrocarbons.

Some non-hydrocarbons having at least one non-aromatic carbon-to-hydrogen bond may be converted in a manner analogous to the hydrocarbons having the same carbon skeleton. The process of the present invention is equally applicable to the conversion of such compounds, provided the feed, intermediates and product are not soluble in the aqueous solvent comprising hydrogen iodide and iodine and do not react with the iodine species to give undesired side reaction products to a substantial degree.

The organic feed may be a pure iodine-reactive compound or it may be an iodine-reactive compound in admixture with different iodine-reactive compounds or it may be an iodine-reactive compound in admixture with inert compounds. An inert compound, for example, is benzene or naphthalene, which is not converted in any manner under the conditions of this invention.

The following conditions are suitable for use in the process of the present invention.

The temperature in the dehydrogenation reaction zone (second reaction zone), in which the organic iodine-reactive compound is converted, is above 300° C. It is suitably between 450° C. and 800° C. Relatively low molecular weight reactants may be converted at higher temperatures within the given range. The temperature selection is also affected by the choice of other reaction conditions including contact time, pressure and degree of dilution with inert diluent. It is preferred to maintain a temperature of at least 525° C. in the second reaction zone. The preferred range in most cases is between 550° and 650° C.

The temperature in the hydrogen iodide oxidation zone (first reaction zone) which precedes and communicates with the dehydrogenation reaction zone is determined by the quantity of hydrogen iodide entering the oxidation zone, as well as by the temperature, and composition of the stream in the oxidation zone. The amount of oxygen introduced is preferably sufficient to convert all the hydrogen iodide in said zone to elemental iodine. It is preferred to adjust temperature conditions in such a manner that the temperature of the stream leaving the zone is at least as high as the desired reaction temperature to be maintained in the dehydrogenation reaction zone, although it may be somewhat lower or higher. The temperature of the stream leaving the first and entering the second reaction zone is preferably at least 525° C. Provision can be made to provide some heat in the first reaction zone by combustion of a suitable fuel, e.g. methane or natural gas, within the zone. The conditions are adjusted to substantially complete the combustion. The resulting combustion gases pass through the rest of the system as inert diluent. Little or no extraneous fuel is burned in the first reaction zone in the preferred operation, except that it may be required when starting up the process. The hydrogen iodide oxidation zone (first reaction zone) may be defined by an unobstructed reaction vessel, or it may be in a reaction vessel packed with chemically inert packing, e.g. quartz chips, or it may be in a reaction vessel containing a catalyst for the oxidation of hydrogen iodide, e.g. a porous acidic siliceous solid such as calcined diatomic earth or activated silica-alumina oil cracking catalyst.

Oxygen is preferably employed in the two communicating reaction zones in the present invention in such a manner that it is essentially completely used up in converting hydrogen iodide to elemental iodine and water. Generally oxygen addition is controlled so that the amount of free oxygen present in the dehydrogenation reaction mixture at any point does not exceed one molecular weight proportion of oxygen per atomic weight proportion of iodine present in all active iodine species in the mixture. When this ratio is exceeded the oxygen is likely to attack organic feed or product compounds to a substantial degree. It is preferred to inject oxygen into the reaction mixture in such quantities that the amount of oxygen in the mixture at the point of injection is in the range between 0.025 and 0.5 molecular weight proportion of oxygen per atomic weight proportion of iodine. The amount of excess oxygen which can be tolerated depends on the choice of reaction temperature and contact time as well as on the feed, intermediates and product compounds present.

The process can be carried out at various pressures from sub-atmospheric to super-atmospheric pressures in vapor phase. In the operation of the process according to the preferred method the pressure is suitable in the range between 1 and 3 atmospheres, absolute, in the reaction zones.

The residence time of the organic reactants at the selected reaction conditions depends on the particular reactant, the proportion of iodine in the reaction mixture, the temperature and pressure, and the nature of the product. In general, the nominal residence time should be at least about 0.01 second and usually at least 0.1 second. It should usually not be over about one minute, but may in some cases be as much as 3 to 5 minutes but no more. With most common reactants, the reaction is very rapid so that a residence time of from 0.1 to 10 seconds suffices and is preferred.

The nominal residence time is the time calculated by adjusting the flow of feed to the temperature and pressure conditions which exist in the reaction zone without adjusting for change in the number of molecules per unit weight of feed.

In order to suppress undesired side reactions, e.g., thermal cracking, it is necessary to maintain a minimum of 0.1 mole of elemental iodine per mole of feed and preferably at least 0.2 mole of iodine per mole of feed present at the point where the feed is first contacted with iodine. The amount of elemental iodine which ultimately contacts the feed and product mixture includes iodine regenerated from hydrogen iodide in the dehydrogenation reaction zone; it may be designated the "effective total amount of iodine" and is greater than the actual amount charged. The actual amount of iodine charged in the practice of the present invention is suitably in the range from 0.01 to 3.0 theories and preferably between 0.1 and 1.0 theory. The amount of iodine charged is thus very substantial. It is usually in the range between 25 percent and 1000 percent by weight, based on the feed; it may be higher, but is not usually lower.

I claim as my invention:

1. A process for the conversion of iodine-reactive organic compounds which comprises maintaining a first reaction zone at conditions supporting the oxidation of hydrogen iodide to iodine and water; injecting into said zone at least hydrogen iodide from a source defined hereinafter and free oxygen; passing the resulting vapor mixture directly into a second reaction zone; adding to the mixture entering said second reaction zone organic feed containing at least one iodine-reactive organic compound at such a rate that the concentration of iodine based on said feed at the point of feed addition is at least 25 percent by weight; causing the resulting vapor mixture to flow through said second reaction zone; maintaining in said second reaction zone conditions supporting the reaction of said iodine-reactive compound with iodine to form organic product and hydrogen iodide; adding in said second reaction zone free oxygen to convert part of the hydrogen iodide therein to iodine and water; withdrawing a vapor effluent stream from said second reaction zone; contacting said effluent stream intimately with a plurality of portions of liquid aqueous solvent in series, said aqueous solvent comprising hydrogen iodide and water at approximately their constant-boiling mixture ratio; recovering from said contact an organic phase substantially free of hydrogen iodide and iodine and portions of an aqueous liquid phase substantially free of organic compounds; recovering desired organic product from said organic phase; returning to contact with effluent from said second reaction zone at least a substantial portion of said aqueous liquid phase after adjusting the concentration of hydrogen iodide, water and iodine therein; recovering from a portion of said aqueous liquid phase a vapor stream comprising hydrogen iodide in substantially enhanced concentration and a liquid mixture of hydrogen iodide, water and elemental iodine having a ratio of hydrogen iodide to water at least equal to that of a constant-boiling mixture; returning said vapor stream of concentrated hydrogen iodide to said first reaction zone; and returning said liquid mixture to said aqueous liquid phase.

2. A process according to claim 1 in which said organic feed consists essentially of hydrocarbons.

3. A process according to claim 1 in which said organic feed comprises normal $C_4$ hydrocarbons and said organic product comprises butadiene.

4. A process according to claim 1 in which additional feed is added into the flowing vapor mixture in said second reaction zone.

5. A process for the conversion of iodine-reactive organic compounds which comprises maintaining a first reaction zone at conditions supporting the oxidation of hydrogen iodide to iodine and water; injecting into said zone at least hydrogen iodide from a source defined hereinafter and an amount of oxygen not exceeding about 1 mole per 4 moles of hydrogen iodide; passing the resulting vapor mixture directly into a second reaction zone; adding to the mixture entering said second reaction zone organic feed containing at least one iodine-reactive organic compound at such a rate that the concentration of iodine based on said feed at the point of feed addition is at least 25 percent by weight; causing the resulting vapor mixture to flow through said second reaction zone; maintaining in said second reaction zone conditions supporting the reaction of said iodine-reactive compound with iodine to form organic product and hydrogen iodide, including a reaction temperature in the range from 450° to 800° C. by adding at spaced intervals free oxygen to convert part of the hydrogen iodide therein to iodine and water; withdrawing a vapor effluent stream from said second reaction zone; contacting said effluent stream intimately with a plurality of portions of liquid aqueous solvent in series, said aqueous solvent comprising hydrogen iodide and water at approximately their constant-boiling mixture ratio; recovering from said contact an organic phase substantially free of hydrogen iodide and iodine and portions of an aqueous liquid phase substantially free of organic compounds; recovering desired organic product from said organic phase; returning to contact with effluent from said second reaction zone at least a substantial portion of said aqueous liquid phase after adjusting the concentration of hydrogen iodide, water and iodine therein; recovering from a portion of said aqueous liquid phase a vapor stream comprising hydrogen iodide in substantially enhanced concentration and a liquid mixture of hydrogen iodide, water and elemental iodine having a ratio of hydrogen iodide to water at least equal to that of a constant-boiling mixture; returning said vapor stream of concentrated hydrogen iodide to said first reaction zone; and returning said liquid mixture to said aqueous liquid phase.

6. A process for the conversion of iodine-reactive organic compounds which comprises maintaining a first reaction zone at conditions supporting the oxidation of hydrogen iodide to iodine and water; injecting into said zone at least hydrogen iodide from a source defined hereinafter and free oxygen; passing the resulting vapor mixture directly into a second reaction zone; adding to the mixture entering said second reaction zone organic feed containing at least one iodine-reactive organic compound at such a rate that the concentration of iodine based on said feed at the point of feed addition is at least 25 percent by weight; causing the resulting vapor mixture to flow through said second reaction zone; maintaining in said second reaction zone conditions supporting the reaction of said iodine-reactive compound with iodine to form organic product and hydrogen iodide; adding in said second reaction zone free oxygen to convert part of the hydrogen iodide therein to iodine and water; withdrawing a vapor effluent stream from said second reaction zone; contacting said effluent stream intimately with a liquid aqueous solvent stream comprising hydrogen iodide and water at approximately their constant-boiling mixture ratio; resolving the resulting admixture into an aqueous liquid phase and an organic phase substantially free of hydrogen iodide and iodine; recovering organic product from said organic phase; dividing said aqueous liquid phase into at least two substantial portions; stripping a vapor stream of concentrated hydrogen iodide from one portion and returning it to said reaction zones to furnish substantially all extraneous hydrogen iodide supplied thereto; adjusting the concentrations of hydrogen iodide, iodine and water in another portion of said aqueous liquid phase and returning it to further contact with said vapor effluent stream; and discarding from the system an amount of water substantially in balance with that formed by oxidation of hydrogen iodide in the system.

7. A process for the conversion of iodine-reactive organic compounds which comprises maintaining a first reaction zone at conditions supporting the oxidation of hydrogen iodide to iodine and water; injecting into said zone at least hydrogen iodide from a source defined hereinafter and free oxygen; passing the resulting vapor mixture directly into a second reaction zone; adding to the mixture entering said second reaction zone organic feed containing at least one iodine-reactive organic compound at such a rate that the concentration of iodine based on said feed at the point of feed addition is at least 25 percent by weight; causing the resulting vapor mixture to flow through said second reaction zone; maintaining in said second reaction zone conditions supporting the reaction of said iodine-reactive compound with iodine to form organic product and hydrogen iodide; adding in said second reaction zone free oxygen to convert part of the hydrogen iodide therein to iodine and water; withdrawing a vapor effluent stream from said second reaction zone; contacting said effluent stream intimately with a liquid aqueous solvent stream comprising hydrogen iodide and water at approximately their constant-boiling mixture ratio; resolving the resulting admixture into an aqueous liquid phase and an organic phase substantially free of hydrogen iodide and iodine; recovering organic product from said organic phase; passing a first substantial portion of said aqueous liquid phase to further contact with reactor effluent vapors; recovering from a second portion of said aqueous liquid phase (a) a stream consisting of elemental iodine, comprising at least the predominant proportion of iodine species contained in said second portion, (b) a stream consisting of water at least approximately equivalent in amount to that formed in the oxidation of hydrogen iodide in the system, and (c) the remaining components of said second portion; returning said stream consisting of elemental iodine to said reaction zones; discarding said stream consisting of water; and combining said remaining components with said first portion of aqueous liquid phase prior to contact with reactor effluent; recovering from a third portion of said aqueous liquid phase (a) a vapor stream containing at least about 65 percent by weight hydrogen iodide and no more than 35 percent by weight water and (b) a liquid mixture of water, hydrogen iodide and elemental iodine having a ratio of hydrogen iodide to water at least equal to that of a constant-boiling mixture; passing at least a portion of the vapor stream of concentrated hydrogen iodide to said first reaction zone to supply substantially all hydrogen iodide charged thereto; passing any remaining part of said vapor stream to said second reaction zone; and combining said liquid mixture with said first portion of aqueous liquid phase prior to contact with reactor effluent.

8. A process for the conversion of iodine-reactive organic compounds which comprises maintaining a first reaction zone at conditions supporting the oxidation of hydrogen iodide to iodine and water; injecting into said zone at least hydrogen iodide from a source defined hereinafter and free oxygen; passing the resulting vapor mixture directly into a second reaction zone; adding to the mixture entering said second reaction zone organic feed containing at least one iodine-reactive organic compound at such a rate that the concentration of iodine based on said feed at the point of feed addition is at least 25 percent by weight; causing the resulting vapor mixture to flow through said second reaction zone; maintaining in said second reaction zone conditions supporting the reaction of said iodine-reactive compound with iodine to form organic product and hydrogen iodide; adding in said second reaction zone free oxygen to convert part of the hydrogen iodide therein to iodine and water; withdrawing a vapor effluent stream from said second reaction zone; contacting said effluent stream intimately with a first portion of a liquid aqueous solvent comprising hydrogen iodide and water; resolving the resulting admixture into a first aqueous liquid phase and a vapor phase containing organic compounds; contacting said organics-containing vapor phase intimately with a second portion of liquid aqueous solvent comprising hydrogen iodide and water at approximately their constant-boiling mixture ratio; recovering an organic vapor phase substantially free of hydrogen iodide and iodine and a second aqueous liquid phase; recovering organic product from said organic vapor phase; passing a substantial portion of the total of said first and second aqueous liquid phases to further contact with reactor effluent vapors as the predominant part of said first portion of liquid aqueous solvent; passing another substantial portion to contact with organic phase as the predominant part of said second portion of liquid aqueous solvent; recovering from another substantial portion a vapor stream containing at least about 65 percent by weight hydrogen iodide and no more than 35 percent by weight water and a liquid mixture of water, hydrogen iodide and elemental iodine containing at least the constant-boiling concentration of hydrogen iodide in water; combining at least a portion of said last mentioned liquid mixture with at least one of the aforementioned portions; and passing at least a substantial portion of said vapor stream of concentrated hydrogen iodide to said first reaction zone and any remainder to said second reaction zone to supply at least a substantial amount of iodine species charged to the combined reaction zones.

9. A process for the conversion of iodine-reactive organic compounds which comprises maintaining a first reaction zone at conditions supporting the oxidation of hydrogen iodide to iodine and water; injecting into said zone at least hydrogen iodide from a source defined hereinafter and free oxygen; passing the resulting vapor mixture directly into a second reaction zone; adding to the mixture entering said second reaction zone organic feed containing at least one iodine-reactive organic compound at such a rate that the concentration of iodine based on said feed at the point of feed addition is at least 25 percent by weight; causing the resulting vapor mixture to flow through said second reaction zone; maintaining in said second reaction zone conditions supporting the reaction of said iodine-reactive compound with iodine to form organic product and hydrogen iodide; adding in said second reaction zone free oxygen to convert part of the hydrogen iodide therein to iodine and water; withdrawing a vapor effluent stream from said second reaction zone; promptly contacting said effluent stream intimately with a first portion of a liquid aqueous solvent comprising hydrogen iodide and water; resolving the resulting admixture into a first aqueous liquid phase substantially free of organic compounds and a vapor phase containing organic compounds; contacting said organics-containing vapor phase intimately with a second portion of liquid aqueous solvent comprising hydrogen iodide and water at a ratio sufficiently near the constant-boiling mixture ratio to form a solution enriched in hydrogen iodide substantially beyond the constant-boiling mixture ratio after said contact; recovering an organic vapor phase substantially free of hydrogen iodide and iodine and a second aqueous liquid phase substantially free of organic compounds; recovering organic product from said organic vapor phase; dividing said first aqueous liquid phase into at least three substantial portions; returning two of said portions to further contact with reactor effluent vapors as the predominant part of said first and second portion of liquid aqueous solvent, respectively; separating and discarding from the third of said portions an amount of water at least equal to that formed in said reaction zones; recovering from said second aqueous liquid phase a vapor stream containing at least 65 percent by weight hydrogen iodide and a liquid mixture of water, hydrogen iodide and elemental iodine, containing at least the constant-boiling concentration of hydrogen iodide in water; combining said liquid mixture with said first recovered aqueous liquid phase; and passing said vapor concentrated hydrogen iodide to said first reaction zone to supply at least a substantial amount of iodine species charged to the combined reaction zones.

10. A process for the conversion of iodine-reactive organic compounds comprising converting hydrogen iodide to iodine and water in vapor phase by means of oxygen in a first reaction zone immediately preceding and communicating with a second reaction zone, converting iodine-reactive compound in said second reaction zone by contact in vapor phase with at least 25 percent by weight of elemental iodine including that formed in said first reaction zone, contacting vapor effluent from said second reaction zone with an aqueous solvent comprising water and hydrogen iodide at about their constant-boiling mixture ratio, recovering a rich solvent phase, stripping from a substantial portion of said rich solvent phase a vapor stream having a substantially higher concentration of hydrogen iodide than said solvent phase and returning at least a substantial portion of said vapor stream of concentrated hydrogen iodide to said first reaction zone to supply at least a substantial part of the iodine requirement for said conversion.

11. A process for the conversion of an iodine-reactive organic feed compound by reaction with iodine in a first reaction zone at a temperature above 300° C. which comprises contacting a vapor mixture comprising at least about 65 percent by weight hydrogen iodide and from 0 to 35 percent by weight water with sufficient oxygen, at hydrogen iodide oxidizing conditions, to convert at least a substantial proportion of the hydrogen iodide to iodine, passing the resulting vapor mixture, at a temperature between 450° and 800° C. into a dehydrogenation reaction zone, adding vaporized feed compound to the vapor stream entering said reaction zone to produce a mixture containing at least 25 percent by weight elemental iodine, based on said feed, and contacting the resulting mixture in said reaction zone to form organic product and hydrogen iodide withdrawing a vapor effluent stream from said reaction zone; contacting the effluent with a liquid aqueous solvent stream comprising water and hydrogen iodide at a ratio sufficiently near the constant-boiling mixture ratio to form a solution enriched in hydrogen iodide substantially beyond the constant-boiling mixture after said contact; stripping a vapor stream of concentrated hydrogen iodide, containing at least 65% by weight of hydrogen iodide from at least a portion of said solvent and returning it to the first reaction zone.

12. A process according to claim 11 in which liquid elemental iodine is vaporized, in the zone in which hydrogen iodide is reacted with oxygen, by the heat liberated in said oxidation reaction.

13. A process for the conversion of iodine-reactive organic compounds which comprises maintaining a first reaction zone at conditions supporting the oxidation of hydrogen iodide to iodine and water; injecting into said zone a vapor stream containing hydrogen iodide in a concentration of at least 65% by weight and free oxygen; passing the resulting vapor mixture directly into a second reaction zone; adding to the mixture entering said second reaction zone organic feed containing at least one iodine-reactive organic compound at such a rate that the concentration of iodine based on said feed at the point of feed addition is at least 25 percent by weight; causing the resulting vapor mixture to flow through said second reaction zone; maintaining said second reaction zone at a temperature in the range between 450° C. and 800° C. by adding controlled amounts of oxygen to each of said reaction zones to release heat by conversion of hydrogen iodide to iodine and water, and controlling the amounts and temperatures of the several streams introduced into and withdrawn from said two reaction zones so that the heat supplied by the exothermic conversion of hydrogen iodide to iodine and water is substantially in balance with the heat required to bring the several streams to said reaction temperature and to supply the endothermic heat of reaction of the iodine-reactive compounds and elemental iodine to form product and hydrogen iodide, withdrawing a vapor effluent stream from said second reaction zone; contacting said effluent with a liquid aqueous solvent stream comprising water and hydrogen iodide at approximately their constant-boiling mixture ratio, stripping a vapor stream of concentrated hydrogen iodide, containing at least 65% by weight hydrogen iodide, from at least a portion of said solvent and returning it to said first reaction zone.

14. A process according to claim 13 in which hydrocarbon feed in liquid phase is injected into the second reaction zone.

References Cited in the file of this patent

UNITED STATES PATENTS

| 1,925,421 | Van Peski | Sept. 5, 1933 |
| 2,259,195 | Baehr et al. | Oct. 14, 1941 |
| 2,276,023 | Mueller-Cunradi et al. | Mar. 10, 1942 |
| 2,315,499 | Cantzler et al. | Apr. 6, 1943 |
| 2,343,108 | Cass | Feb. 29, 1944 |

FOREIGN PATENTS

| 849,804 | France | Aug. 28, 1939 |

OTHER REFERENCES

Ephraim: "Inorganic Chemistry," 5th ed. (1949), Interscience Publishers, Inc., New York, p. 171 relied on.